United States Patent [19]
Zakharov et al.

[11] Patent Number: 6,051,666
[45] Date of Patent: *Apr. 18, 2000

[54] METHOD FOR PREPARING A CATALYST SUITABLE FOR POLYMERIZING AN OLEFIN

[75] Inventors: Vladimir A. Zakharov; Gennadii D. Bukatov; Sergei A. Sergeev, all of Novosibirsk, Russian Federation

[73] Assignee: DSM N.V., Herleen, Netherlands

[*] Notice: This patent issued on a continued prosecution application filed under 37 CFR 1.53(d), and is subject to the twenty year patent term provisions of 35 U.S.C. 154(a)(2).

[21] Appl. No.: 08/948,055

[22] Filed: Oct. 9, 1997

Related U.S. Application Data

[63] Continuation of application No. PCT/NL96/00151, Apr. 9, 1996, which is a continuation-in-part of application No. PCT/NL95/00132, Apr. 10, 1995.

[51] Int. Cl.[7] .............................. C08F 4/44; C08F 110/06; B01J 31/00; B01J 37/00
[52] U.S. Cl. .............................. 526/125.3; 526/124.9; 526/125.1; 526/128; 526/351; 502/125; 502/133
[58] Field of Search .................... 502/125, 133; 526/124.9, 125.1, 125.3, 128

[56] References Cited

U.S. PATENT DOCUMENTS

| | | | |
|---|---|---|---|
| 4,220,554 | 9/1980 | Scata et al. ............... | 252/429 B |
| 4,315,835 | 2/1982 | Scata et al. ............... | 252/429 B |
| 4,365,048 | 12/1982 | Ueno et al. ............... | 526/128 |
| 4,420,594 | 12/1983 | Ueno et al. ............... | 526/128 |
| 4,435,550 | 3/1984 | Ueno et al. ............... | 526/128 |
| 4,814,311 | 3/1989 | Murata et al. ............ | 502/125 |
| 4,814,312 | 3/1989 | Murata et al. ............ | 502/125 |
| 4,814,313 | 3/1989 | Murata et al. ............ | 502/125 |
| 4,960,743 | 10/1990 | Murata et al. ............ | 502/125 |
| 5,189,124 | 2/1993 | Sasaki et al. ............. | 502/125 |
| 5,849,655 | 12/1998 | Shamshoum et al. ..... | 502/125 |
| 5,891,817 | 4/1999 | Shamshoum et al. ..... | 526/128 |

FOREIGN PATENT DOCUMENTS

| | | |
|---|---|---|
| 0 206 817 A1 | 6/1986 | European Pat. Off. . |
| 0 440 813 A1 | 8/1990 | European Pat. Off. . |
| 2 392 038 | 5/1978 | France . |
| 54-70385 | 6/1979 | Japan ............... 502/125 |
| 7805523 | 5/1978 | Netherlands . |

*Primary Examiner*—Elizabeth Wood
*Assistant Examiner*—J. Pasterczyk
*Attorney, Agent, or Firm*—Pillsbury Madison & Sutro LLP. Intellectual Property Group

[57] ABSTRACT

A method for polymerizing at least one olefin by contacting at least one olefin with a polymerization catalyst and an organometallic compound containing a metal from group 1, 2, 12 or 13 of the Periodic System of Elements under effective polymerization conditions. The polymerization catalyst is obtained by contacting metallic magnesium with an aromatic halide, RX, under conditions effective to obtain a first reaction product and solid residual products. The first reaction product is then separated from the solid residual products. A silane compound containing an alkoxy or aryloxy group is added to the first reaction product between −20° C. to 20° C. to obtain a precipitate which is purified to obtain a second reaction product. Subsequently, the second reaction product is contacted with a halogenized titanium compound, such as titanium tetrachloride, to obtain a further reaction product. The polymerization catalyst is obtained by purifying the further reaction product. In the aromatic halide, R represents an aromatic group containing from 6 to 20 carbon atoms and X represents a halide.

13 Claims, No Drawings

METHOD FOR PREPARING A CATALYST SUITABLE FOR POLYMERIZING AN OLEFIN

RELATED APPLICATIONS

This application is a continuation/PCT/NL96/00151 filed Apr. 9, 1996, which is a continuation-in-part of PCT/NL95/00132, filed Apr. 10, 1995, the complete disclosures of which are incorporated herein by reference.

FIELD OF THE INVENTION

The invention relates to a method for the preparation of a catalyst suitable for the polymerisation of an olefins by contacting a magnesium compound with a halogenized Ti-compound.

BACKGROUND INFORMATION

Such a method is known from NL-A-7805523, which discloses, amongst other things, that a catalyst suited to the polymerisation of olefins can be obtained by contacting a magnesium compound, which is obtained by reacting during one reaction step metallic magnesium with an organic halide RX, where R is an alkyl, alkenyl, aryl or cycloalkyl group containing from 1 to 20 carbon atoms, and X is a halogen, and an alkoxy group or aryloxy group-containing silane compound with a halogenized Ti-compound.

SUMMARY AND OBJECTS OF THE INVENTION

A drawback of the aforementioned method for the preparation of the catalyst is that the activity of the catalyst obtained is poor. The aim of the invention is to obtain a method for the preparation of the catalyst in which this drawback does not occur.

The invention is characterised in that:

the magnesium compound is obtained by:

a) contacting metallic magnesium with an aromatic halide RX, where R is an aromatic group containing from 6 to 20 carbon atoms and X is a halogen, whereupon the dissolved reaction product I is separated from the solid residual products and then b) adding an alkoxy group or aryloxy group-containing silane compound to the obtained reaction product I at a temperature of from −20 to 20° C., whereupon the precipitate is purified to obtain reaction product II, which subsequently, during a step c, is contacted with $TiCl_4$ as halogenized Ti-compound and is purified to obtain a catalyst.

In this way a highly active catalyst is obtained.

A further advantage of the catalyst obtained by the process described above is that, when used for the polymerization of propylene, this catalyst yields a polypropylene which is highly isotactic. Furthermore, the polyolefin powder produced with the catalyst of the invention contains few small particles.

From EP-A-0,319,227 a similar method is known for the production of a catalyst suitable for the polymerization of an olefin. According to this patent publication, however, it is necessary to carry out an extra reaction step using a halogen-containing alcohol if a catalyst exhibiting good activity is to be obtained.

DETAILED DESCRIPTION OF THE INVENTION

The first step in the process for the preparation of the catalyst of the invention is carried out by contacting metallic magnesium with an aromatic halide RX.

All forms of metallic magnesium may be used as metallic magnesium, but preferably use is made of finely divided metallic magnesium, for example magnesium powder. To obtain a fast reaction it is preferable to heat the magnesium under nitrogen prior to use. In the aromatic halide RX, R is an aromatic group preferably containing from 6 to 18 carbon atoms and X preferably is chlorine or bromine. Chlorobenzene, bromobenzene and iodinebenzene can be mentioned as examples. Preferably chlorobenzene is used as the aromatic halide RX.

The magnesium and the aromatic halide RX are preferably brought into contact with one another in the presence of an inert dispersant and an ether. Examples of dispersants are: aliphatic, alicyclic or aromatic solvents containing 4–10 carbon atoms. Examples of ethers are:

diethyl ether, diisopropyl ether, dibutyl ether, diisobutyl ether, diisoamyl ether, diallyl ether, tetrahydrofuran (THF) and anisole. It is preferred for dibutyl ether and/or diisoamyl ether to be used.

Preferably, chlorobenzene is used as dispersant. Thus, the chlorobenzene serves as dispersant as well as aromatic halide RX.

The aromatic halide/ether ratio is important with respect to obtaining an active catalyst. The chlorobenzene/dibutyl ether volume ratio may for example vary between 75:25 and 35:65.

When the chlorobenzene/dibutyl ether ratio decreases, the bulk density of the polyolefine powder prepared with the aid of the catalyst becomes lower and when the chlorobenzene/dibutyl ether ratio increases, the amount of the dissolved reaction product I becomes lower. Consequently, the best results are obtained when the chlorobenzene/dibutyl ether volume ratio is between 70:30 and 50:50.

Small amounts of iodine and/or alkyl halides can be added to cause the reaction between the metallic magnesium and the aromatic halide RX to proceed at a higher rate. Examples of alkyl halides are butyl chloride, butyl bromide and 1,2-dibromoethane. The reaction temperature for step a normally is between 20 and 150° C.; the reaction time between 0.5 and 20 hours.

After the reaction is completed, the dissolved reaction product I is separated from the solid residual products.

During step b of the reaction, the dissolved reaction product I, obtained on carrying out step a of the reaction, is brought into contact with an alkoxy group or aryloxy group-containing silane compound. This is accomplished by adding the alkoxy group or aryloxy group-containing silane compound to the dissolved reaction product I at a temperature of from −20 to 20° C. Preferably at a temperature of from −5 to 5° C. Preferably, reaction product I is contacted with the alkoxy group or aryloxy group-containing silane compound in the presence of an inert hydrocarbon solvent such as the solvents mentioned as dispersant in the discussion of step a. Preferably, step b is carried out with stirring. The Si/Mg molar ratio during step b may vary from 0.2 to 20. Preferably, the Si/Mg molar ratio is from 0.4 to 1.0. The product from step b is rinsed with an inert hydrocarbon solvent and then used for the preparation of the catalyst.

The following examples of alkoxy group or aryloxy group-containing silane compounds may be mentioned: tetramethoxysilane, tetraethoxysilane, tetrabutoxysilane, tetraisobutoxysilane, tetraphenoxysilane, tetra(p-methylphenoxy) silane, tetrabenzyloxysilane, methyltrimethoxysilane, methyltriethoxysilane, methyltributoxysilane, methyltriphenoxysilane, methyltriphenoxysilane, ethyltriethoxysilane, ethyltriisobutoxysilane, ethyltriphenoxysilane, butyltrimethoxysilane, butyltriethoxysilane, butyltributoxysilane, butyltriphenoxysilane, isobutyltriisobutoxysilane, vinyl triethyoxysilane, allyltrimethoxysilane, phenyltrimethoxysilane, phenyltriethoxysilane, benzyltriphenoxysilane, methyltriallyloxysilane, dimethyldimethoxysilane, dimethyldiethoxysilane, dimethyldiisopropyloxysilane, dimethyldibutoxysilane, dimethyldihexyloxysilane, dimethyldiphenoxysilane, diethyldiethoxysilane, diethyldiisobutoxysilane, diethyldiphenoxysilane, dibutyldiisopropyloxysilane, dibutyldibutoxysilane, dibutyldiphenoxysilane, diisobutyldiethoxysilane, diisobutyldiisobutoxysilane, diphenyldimethoxysilane, diphenyldiethoxysilane, diphenyldibutoxysilane, dibenzyldiethoxysilane, divinyl diphenoxysilane, diallyldipropoxysilane, diphenyldiallyloxysilane, methylphenyldimethoxysilane and chlorophenyldiethyoxysilane.

Preferably use is made of tetraethoxysilane. The preparation of the catalyst is carried out by contacting, during a step c, the purified reaction product from step b with $TiCl_4$.

Preferably an electron donor is also present during step c. Examples of electron donors are carboxylic acids, carboxylic anhydrides, esters of carboxylic acids, halide carboxylic acids, alcohols, ethers, ketones, amines, amides, nitriles, aldehydes, alcoholates, sulphonamides, thioethers, thioesters, organic silicon compounds and organic compounds containing a heteroatom, such as nitrogen, oxygen and phosphorus.

Examples of carboxylic acids are formic acid, acetic acid, propionic acid, butyric acid, isobutanoic acid, acrylic acid, methacrylic acid, maleic acid, fumaric acid, tartaric acid, cyclohexanoic monocarboxylic acid, cis-1,2-cyclohexanoic dicarboxylic acid, phenylcarboxylic acid, toluenecarboxylic acid, naphthalene carboxylic acid, phthalic acid, isophthalic acid, terephthalic acid and trimellitic acid.

Anhydrides of the aforementioned carboxylic acids can be mentioned as examples of carboxylic anhydrides, such as acetic acid anhydride, butyric acid anhydride and methacrylic acid anhydride.

Examples of esters of carboxylic acids that can be mentioned are butyl formate, ethyl acetate, butyl acetate, ethyl acrylate, methyl methacrylate, isobutyl methacrylate, methylbenzoate, ethylbenzoate, methyl-p-toluate, ethyl-α-naphthoate, monomethyl phthalate, dibutyl phthalate, diisobutyl phthalate, diallyl phthalate and diphenyl phthalate.

Examples of halide carboxylic acids that can be mentioned are the halides of the above carboxylic acids, such as acetyl chloride, acetyl bromide, propionyl chloride, butanoyl chloride, butanoyl iodide, benzoyl bromide, p-toluyl chloride and phthaloyl dichloride.

Examples of suitable alcohols are methanol, ethanol, butanol, isobutanol, xylenol and benzyl alcohol.

Examples of suitable ethers are diethyl ether, dibutyl ether, diisoamyl ether, anisole and ethylphenyl ether, 2,2-diisobutyl-1,3-dimethoxypropane, 2,2-dicyclopentyl-1,3-dimethoxypropane and 2-ethyl-2-butyl-1,3-dimethoxypropane.

Examples of organic silicon compounds that are suitable as electron donor are: tetramethoxysilane, tetraethoxysilane, methyltrimethoxysilane, methyltributoxysilane, ethyltriethoxysilane, phenyltriethoxysilane, diethyldiphenoxysilane.

Examples of organic compounds containing a heteroatom are 2,2,6,6-tetramethylpiperidine, 2,6-dimethylpiperidine, 2-methylpyridine, 4-methylpyridine, imidazole, benzonitrile, aniline, diethylamine, dibutyl amine, thiophenol, 2-methylthiophene, isopropyl mercaptan, diethylthioether, diphenylthioether, tetrahydrofuran, dioxane, dimethylether, diethylether, anisole, acetone, triphenylphosphine, triphenylphosphite, diethylphosphate and diphenylphosphate.

Preferably dibutyl phthalate is used as the electron donor.

The $TiCl_4/Mg$ molar ratio during step c preferably is between 10 and 100. Most preferably, this ratio is between 10 and 50. The molar ratio of the electron donor, if used, relative to the magnesium in step c may vary between 0.05 and 0.75. Preferably this molar ratio is between 0.1 and 0.4.

During step c use is preferably made of a solvent of an aliphatic or aromatic hydrocarbon compound. Most preferably, the solvent is toluene or chlorobenzene. The reaction temperature during step c is preferably 80–150° C., most preferably 90–120° C. At higher or lower temperatures the activity of the catalyst of the invention is undesirably low. The obtained reaction product is purified to obtain a catalyst.

The catalyst of the invention is suitable for the preparation of polyolefins by polymerizing an olefin in the presence of the catalyst and an organometallic compound containing a metal from group 1, 2, 12 or 13 of the Periodic System of the Elements (Handbook of Chemistry and Physics, 70th Edition, CRC Press, 1989–1990). Preferably the organometallic compound is an organoaluminium compound. As the organoaluminium compound use is made of compounds having the formula $R_nAlX_{3-n}$, where X is a halogen atom, an alkoxy group or a hydrogen atom, R is an alkyl group or an aryl group and $1 \leq n \leq 3$. Examples of organoaluminium compounds are trimethyl aluminium, triethyl aluminium, dimethyl aluminium chloride, diethyl aluminium chloride, diethyl aluminium iodide, diisobutyl aluminium chloride, methyl aluminium dichloride, ethyl aluminium dichloride, ethyl aluminium dibromide, isobutyl aluminium dichloride, ethyl aluminium sesquichloride, dimethyl aluminium methoxide, diethyl aluminium phenoxide, dimethylaluminium hydride and diethyl aluminium hydride. An electron donor may also be present during the polymerization of an olefin. Examples of possible electron donors are described above with relation to the execution of step c of the preparation of the catalyst. Preferably an alkoxysilane is used as the electron donor during the polymerization.

The molar ratio of metal relative to Ti during the polymerization may vary from 0.1 to 2000. Preferably this ratio is between 5 and 300. The concentration of the electron donor in the polymerization mixture is between 0.5 and 5 mol/l.

The catalyst is suitable for the polymerization of mono- and diolefins containing from 2 to 10 carbon atoms, such as ethylene, propylene, butylene, hexene, octene, butadiene and mixtures thereof. The catalyst is particularly suitable for the polymerization of propylene and mixtures of propylene and ethylene.

The polymerization can be carried out in the gas phase or in the liquid phase. In the case of polymerization in the liquid phase a dispersing agent is present, such as n-butane, isobutane, n-pentane, isopentane, hexane, heptane, octane, cyclohexane, benzene, toluene or xylene. Liquid olefin can also be used as a dispersing agent. The polymerization temperature is usually between 0° C. and 120° C., preferably it is between 40° C. and 100° C. The pressure during the polymerization is normally between 0.1 and 6 MPa. The molecular weight of the polyolefin that is formed during the polymerization is controlled by adding during the polymerization hydrogen or any other agent known to be suitable for the purpose.

The polymerization can be carried out in continuous mode or batchwise. The polymerization can be carried out in several, successive steps. The polymerization can also be carried out by first effecting the polymerization in the liquid phase and then in the gas phase.

The invention will be further elucidated with reference to the examples without being limited hereto.

EXAMPLES

Example I

Preparation of Reaction Product I

A three-necked flask, fitted with a reflux condenser and a funnel, was filled with magnesium powder (26 g, 1.07 mol). The flask was brought under nitrogen. The magnesium was heated at 80° C. for 1 hour, after which a mixture of dibutyl ether (173 ml) and chlorobenzene (80 ml) was added. Then iodine (0.03 g) and n-chlorobutane (3 ml) were successively added to the reaction mixture. After the colour of the iodine had disappeared, the temperature was raised to 97° C. and chlorobenzene (250 ml) was slowly added in 2.5 hours. The dark reaction mixture that was formed in the process was stirred for another 8 hours at 97° C. Then the stirring and heating were stopped and the solid material was allowed to settle for 48 hours. By decanting the solution above the precipitate, which contained reaction product I, a solution with a concentration of 1 mol/l of the soluble reaction product I was obtained. This solution was used in the further catalyst preparation.

Preparation of Reaction Product II

The solution of reaction product I (100 ml, 1 mol/l) was dosed to a reactor. This solution was cooled to 0° C. and a mixture of tetraethoxysilane (TES) (11.2 ml) and dibutyl ether (38 ml) was added, with stirring, in 2 hours.

After the solution had been added the reaction mixture was kept at 0° C. for another 0.5 hour, with stirring, after which the temperature was raised to 60° C. Then the reaction mixture was kept at 60° C. for 1 hour, after which the stirring and heating were stopped and the solid substance was allowed to settle in 30 minutes. The supernatant was removed by decanting. The solid substance was rinsed five times using 150 ml of heptane. A pale yellow solid substance, reaction product II (13.5 g), was obtained, suspended in 40 ml of heptane.

Preparation of the Catalyst

A reactor was brought under nitrogen and 300 ml of titanium tetrachloride was dosed into it. Then the reaction mixture was heated to 115° C. A slurry, containing 12 g of reaction product II in 36 ml of heptane, and dibutyl phthalate (7.2 ml) were added and the reaction mixture was stirred at 115° C. for 2 hours. Then the stirring was stopped and solid substance was allowed to settle for 30 minutes.

The supernatant was removed by decanting, after which a mixture of titanium tetrachloride (150 ml) and chlorobenzene (150 ml) was added. The reaction mixture was again heated to 115° C. and stirred for 30 min., after which the solid substance was allowed to settle for 30 minutes. This last cycle was repeated one more time. The solid substance obtained was rinsed five times using 300 ml of heptane of 60° C., after which the catalyst, suspended in heptane, was obtained.

Polymerization of Propylene (1) A stainless steel polymerization reactor was inertized with nitrogen and was then filled with dry heptane free of oxygen (290 ml). Then triethyl aluminium (TEA) (1.2 mmol as a solution in 5 ml of hexane), phenyltriethoxysilane (0.06 mmol as a solution in 5 ml of hexane) and catalyst (0.01 g as a slurry in 1 ml of hexane) were dosed. Furthermore 55 nml of hydrogen was dosed and propylene was dosed until a pressure of 0.2 MPa was reached. The reactor was then quickly brought to polymerization conditions, with stirring: temperature 70° C., pressure 0.5 MPa. The polymerization was then allowed to take place under said conditions for 2 hours. Then the pressure was reduced to atmospheric pressure. The reactor contents were drained, after which the powder was separated from the heptane. The polypropylene powder was now dried further in a vacuum drying stove. In this way, 67.3 g of polypropylene powder was obtained (see Table 1).

Example II

The catalyst was prepared as described in Example I. Propylene polymerization was carried out in a stainless steel reactor that was inerted with nitrogen and was then filled with dry n-heptane free of oxygen (5.5 l). Then 8 mmol of TEA, 0.4 mmol of phenyltriethoxysilane and 0.071 g of catalyst were added as a slurry in 5 ml of n-heptane. Then the reactor was heated to 70° C. Propylene containing 2 vol. % hydrogen was dosed until a pressure of 0.8 MPa was reached for 2 hours. 1065 g of polypropylene powder was obtained (see Table 1).

Example III

Preparation of Reaction Product I

Reaction product I was prepared as described in Example I, except that diisoamyl ether was used instead of dibutyl ether.

Preparation of Reaction Product II

Reaction product II was prepared as described in Example I, except that the tetraethoxysilane was added to the reactor in 70 minutes instead of in 2 hours. 14.2 g of reaction product II was obtained.

Preparation of the Catalyst

The catalyst was prepared as described in Example I, except that 150 ml of titanium tetrachloride plus 150 ml of chlorobenzene were added to the reactor instead of 300 ml of titanium tetrachloride. The slurry, containing reaction product II (12 g in 36 ml of heptane) and dibutyl phthalate (7.2 ml) were added. Thereafter the reaction mixture was heated to 115° C. The reaction mixture was kept at 115° C. for 1 hour instead of 2 hours.

Polymerization of Propylene

Propylene was polymerized as described in Example I (see Table 1).

Example IV

Preparation of Reaction Product I

Reaction product I was prepared as described in Example I, except that 32 g of magnesium powder was used instead of 26 g of magnesium powder and the reaction with chlorobenzene was carried out at 110° C. instead of at 97° C. The solution obtained contained 1.67 mol/l of reaction product I.

Preparation of Reaction Product II

Reaction product II was prepared as described in Example I, except that the tetraethoxysilane was added to the reactor in 80 minutes instead of in 2 hours.

Preparation of the Catalyst

The catalyst was prepared as described in Example I.

Polymerization of Propylene

The polymerization of propylene was carried out as described in Example I (see Table 1).

Example V

Preparation of Reaction Product I, Reaction Product II and the Catalyst

Reaction product I, reaction product II and the catalyst were prepared as described in Example IV.

Polymerization of Propylene

Propylene was polymerized in the gas phase in a stainless steel reactor at a constant propylene pressure and a constant temperature of 70° C., in the presence of hydrogen. 0.8 mmol of TEA as a solution in 7 ml of n-hexane, 0.04 mmol of phenyltriethoxysilane as a solution in 7 ml of n-hexane, 0.012 g of catalyst as a slurry in 1 ml of n-hexane and 55 nml of hydrogen were dosed into the reactor, after which gaseous propylene was dosed until a pressure of 1.5 atm was reached. All this was carried out at a temperature of 40° C. Then the temperature was raised to 70° C. and the propylene pressure to 5 atm. The polymerization took place for 2 hours, after which 86.4 g of polypropylene powder was obtained (see Table 1).

Comparative Experiment A

Preparation of Reaction Product I

Reaction product I was prepared as described in Example I, after which the solid substance and the solution of reaction product I were not separated.

Preparation of Reaction Product II

Reaction product II was prepared as described in Example I, using the mixture of the solid substance and the solution of reaction product I as reaction product I (100 ml of slurry, 0.2 mol Mg). 23.1 g of product A was obtained.

Preparation of the Catalyst and the Polymerization of Propylene

These were carried out as described in Example I (see the Table).

Comparative Experiment B

Preparation of the Catalyst

Reaction product II was prepared in the same way as described above in Example I. Then reaction product II was brought into contact with 2,2,2-trichloroethanol as follows: a slurry of reaction product II (6.3 g) in heptane (50 ml) was introduced, under nitrogen, into a three-necked flask (300 ml) fitted with a reflux condenser, a stirrer and a dropping funnel. This slurry was stirred at room temperature and 2,2,2-trichloroethanol (2.0 ml, 0.02 mmol) dissolved in n-heptane (11 ml) was added in 30 minutes. After all the alcohol had been added, the total reaction mixture was stirred for one hour at 80° C. Then the solid substance was removed through filtration and was rinsed four times, at room temperature, using n-hexane (100 ml each time) and twice using toluene (100 ml each time). The final product was then treated with titanium tetrachloride and electron donor in the manner described above for the preparation of the catalyst in Example I.

Polymerization of Propylene

Finally, a polymerization was carried out with this product as described above for the polymerization of propylene in Example I (see Table 1).

Comparative Experiment C

Preparation of Reaction Product II

Reaction product II was prepared as follows: a three-necked flask, fitted with a reflux condenser and a funnel, was filled with magnesium powder (6 g, 0.25 mol). The flask was brought under nitrogen, after which the magnesium was heated at 80° C. for 1 hour. Then 42.4 ml of dibutyl ether (0.25 mol), 55.8 ml of tetraethoxysilane (0.25 mol), 15 ml of chlorobenzene, 2 ml of n-chlorobutane and 0.02 g of iodine were dosed.

Then the mixture was stirred at 80° C. until the colour of the iodine disappeared, after which the mixture was heated to 120° C. and 70 ml of chlorobenzene was added in 2 hours, after which the stirring was continued for another 4 hours at 120° C. The stirring was stopped and the solid substance was allowed to settle in 30 minutes. The supernatant was removed by decanting. The precipitate was rinsed four times using n-heptane (250 ml) of 60° C. Reaction product II was obtained, suspended in heptane.

The Preparation of the Catalyst

The catalyst was prepared as described in Example I, using the reaction product II obtained in the above reaction as reaction product II.

Polymerization of Propylene

Propylene was polymerized as described in Example I, using the catalyst prepared as described above.

TABLE 1

| | Polymerisation results | | | | | | |
|---|---|---|---|---|---|---|---|
| Ex- | CY | | | II | BD | d50 | span |
| am-ple | kg of PP/g cat | kg of PP/g Ti | APP (wt %) | (wt %) | (kg/m³) | (µm) | (d90 – d10)/d50 |
| 1 | 6.8 | 309 | 1.0 | 98.4 | 0.42 | 250 | 0.5 |
| 2 | 15.1 | 686 | 1.0 | 97.8 | 0.42 | 325 | 0.5 |
| 3 | 6.4 | 246 | 0.9 | 97.2 | 0.36 | 950 | 1.5 |
| 4 | 8.1 | 289 | 1.2 | 97.8 | 0.37 | 1180 | 1.4 |
| 5 | 7.2 | 257 | — | 96.1 | 0.37 | 1160 | 1.4 |
| A | 4.8 | 267 | 1.6 | 97.2 | 0.32 | 280 | 1.8 |
| B | 6.7 | 279 | 1.0 | 98.5 | 0.41 | 260 | 0.5 |
| C | 4.1 | 227 | 1.4 | 96.8 | 0.38 | 425 | 3.3 |

Measuring Methods:

The catalyst yield (CY) is the number of kg of propylene powder obtained per g of catalyst or per g of Ti.

The weight percentage of atactic polypropylene (APP) was determined as follows: 250 ml of the filtrate (y ml) obtained in separating the polypropylene powder (x g) and the hexane was dried over a steam bath and then in vacuo at 60° C. That yielded z g of APP. The total amount of APP (q g) is: (y/250)*z. The weight percentage of APP is: (q/(q+x))*100%.

The isotacticity index (II) of the polypropylene powder was determined as follows: 5 g of polypropylene powder was extracted with the aid of n-heptane in a Soxhlet extractor for 4 hours. The weight percentage of the polypropylene powder that does not dissolve in the boiling n-heptane is the isotacticity index.

The bulk density of the polypropylene powder (BD) was determined in accordance with ASTM D 1895.

The d50 and the span were determined in accordance with ASTM D1921, method A.

What is claimed is:

1. A method for polymerizing at least one olefin comprising:

contacting said at least one olefin with a polymerization catalyst and an organometallic compound containing a metal from group 1, 2, 12 or 13 of the Periodic System of Elements under effective polymerization conditions, wherein said catalyst is obtained by a method consisting essentially of (a) contacting metallic magnesium with an aromatic halide represented by RX, wherein R represents an aromatic group containing from 6 to 20 carbon atoms and X represents a halide, under conditions effective to obtain a reaction product I and solid residual products, whereupon the reaction product I is separated from the solid residual products, (b) adding an alkoxy group or an aryloxy group-containing silane compound to the reaction product I at a temperature of from −20° C. to 20° C. to obtain a precipitate whereupon the precipitate is purified to obtain a reaction product II, and (c) subsequently contacting said reaction product II with a halogenized titanium compound comprising titanium tetrachloride to obtain a further product and purifying said further product to obtain said catalyst.

2. A method according to claim 1, wherein said at least one olefin comprises propylene.

3. A method according to claim 1, wherein in (a) said metallic magnesium and said aromatic halide are contacted in the presence of an inert dispersant and an ether.

4. A method according to claim 3, wherein said inert dispersant comprises aliphatic, alicyclic or aromatic solvents having 4–10 carbon atoms.

5. A method according to claim 3, wherein said ether is at least one member selected from the group consisting of diethyl ether, diisopropyl ether, dibutyl ether, diisobutyl ether, diisoamyl ether, diallyl ether, tetrahydrofuran, and anisole.

6. A method according to claim 1, wherein in (a) said metallic magnesium and said aromatic halide are contacted in the presence of at least one ether.

7. A method according to any one of claims 3, 4, 5 or 6, wherein the aromatic halide and ether are used in a volume ratio in the range of 75:25 to 35:65.

8. A method according to claim 7, wherein said volume ratio is in the range of 70:30 to 50:50.

9. A method according to claim 1, wherein in (c) said reaction product II is contacted with said halogenized titanium compound in the presence of an electron donor.

10. A method according to claim 9, wherein said electron donor is dibutyl phthalate.

11. A method according to claim 1, wherein the aromatic halide is phenylchloride.

12. A method according to claim 1, wherein the alkoxy group or aryloxy group-containing silane compound is tetraethoxysilane.

13. A method for polymerizing at least one olefin comprising:

contacting said at least one olefin with a polymerization catalyst and an organometallic compound containing a metal from group 1, 2, 12 or 13 of the Periodic System of Elements under effective polymerization conditions, wherein said catalyst is obtained by a method consisting essentially of:

(a) contacting metallic magnesium with an aromatic halide represented by RX, wherein R represents an aromatic group containing from 6 to 20 carbon atoms and X represents a halide, under conditions effective to obtain a reaction product I and solid residual products, whereupon the reaction product I is separated from the solid residual products, (b) adding an alkoxy group or an aryloxy group-containing silane compound to the reaction product I at a temperature of from −20° C. to 20° C. to obtain a precipitate whereupon the precipitate is purified to obtain a reaction product II, and (c) subsequently contacting said reaction product II with a halogenized titanium compound comprising titanium tetrachloride to obtain a further product and purifying said further product to obtain said catalyst, and wherein said reaction products and said catalyst are not contacted with a halogen-containing alcohol.

* * * * *

UNITED STATES PATENT AND TRADEMARK OFFICE
CERTIFICATE OF CORRECTION

PATENT NO. : 6,051,666

DATED : April 18, 2000

INVENTOR(S) : Vladimir A. Zakharov, et al.

It is certified that error appears in the above-identified patent and that said Letters Patent is hereby corrected as shown below:

On the title page, Item [54] should read: -- CATALYTIC METHOD FOR THE POLYMERIZATION OF OLEFINS--.

Signed and Sealed this

Twenty-seventh Day of June, 2000

*Attest:*

Q. TODD DICKINSON

*Attesting Officer*        *Director of Patents and Trademarks*